US011449872B2

(12) United States Patent
Fasoli et al.

(10) Patent No.: US 11,449,872 B2
(45) Date of Patent: Sep. 20, 2022

(54) SINGLE ENTRY COMBINED FUNCTIONALITY

(71) Applicant: Synchrony Bank, Stamford, CT (US)

(72) Inventors: David Fasoli, Stamford, CT (US); Clarinda Gurr, Stamford, CT (US); Erin Gadhavi, Stamford, CT (US); Annabel Larsen, Stamford, CT (US); Kendra Larsen, Stamford, CT (US); Craig Urbansky, Stamford, CT (US); Sally Yijing Yang, Stamford, CT (US); Bete Johnson, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 16/684,482

(22) Filed: Nov. 14, 2019

(65) Prior Publication Data

US 2020/0160337 A1    May 21, 2020

Related U.S. Application Data

(60) Provisional application No. 62/926,658, filed on Oct. 28, 2019, provisional application No. 62/770,434, filed on Nov. 21, 2018.

(51) Int. Cl.
*G06Q 20/40* (2012.01)
*G06Q 40/08* (2012.01)

(52) U.S. Cl.
CPC ......... *G06Q 20/405* (2013.01); *G06Q 40/08* (2013.01)

(58) Field of Classification Search
CPC .............. G06Q 20/405; G06Q 40/08
See application file for complete search history.

(56) References Cited

U.S. PATENT DOCUMENTS

| 7,529,700 | B1 * | 5/2009 | Kessler | G06Q 40/02 |
| | | | | 705/2 |
| 8,191,140 | B2 * | 5/2012 | Cohen | G06F 21/554 |
| | | | | 705/2 |
| 9,916,633 | B1 * | 3/2018 | Courtright | G06Q 20/102 |
| 10,296,880 | B2 * | 5/2019 | Miller | G06Q 20/14 |
| 10,360,563 | B1 * | 7/2019 | Clubb | G06Q 20/105 |
| 2003/0046421 | A1 * | 3/2003 | Horvitz | G06Q 30/02 |
| | | | | 709/238 |
| 2004/0111302 | A1 * | 6/2004 | Falk | G06Q 40/02 |
| | | | | 705/4 |

(Continued)

FOREIGN PATENT DOCUMENTS

WO    WO-0250743 A1 *    6/2002    ........... G06Q 20/346

OTHER PUBLICATIONS

Patent Cooperation Treaty; "International Search Report & Written Opinion"; Application No. PCT/US2019/061544; dated Apr. 16, 2020; pp. 1-9.

(Continued)

*Primary Examiner* — Patrick McAtee
*Assistant Examiner* — Terry Nathan Murray
(74) *Attorney, Agent, or Firm* — Polsinelli PC

(57) ABSTRACT

Computer-implemented methods are provided for receiving information corresponding to a transaction, where the information is received one time. Two or more functions associated with the information can be determined, and two or more functions can be concurrently and automatically executed without additional interaction.

39 Claims, 17 Drawing Sheets

| SERVICES | | IDENTIFICATION | INSURANCE | FINANCING | SETTLEMENT |
|---|---|---|---|---|---|
| 1. Consumer visits provider | 2. Office Admin enters in services/products into patient's file in PMS | 3. Cardholder presents CareCredit card | 4. Real time insurance adjudication where available pending items auto-submitted for review, client responsibility calculated. | 5. Cardholder selects payment method, amount (and promotional financing where available) | 6. For credit, payment minus fees moved to provider account in 2 business days. Completion of adjudication on outstanding insurance items issued as cardholder statement credit. |

| | into patient's file in PMS | | Insurance $200 approved (other items pending) | CH Responsibility $1800 (settled) | Provider receives $2000-fees in 2 business days Additional adjudication results in CH statement credit $300 (refunded) |

(56) References Cited

U.S. PATENT DOCUMENTS

| | | | |
|---|---|---|---|
| 2005/0074028 A1* | 4/2005 | Wugofski | H04M 1/72561 370/468 |
| 2006/0036523 A1 | 2/2006 | Stover et al. | |
| 2007/0100664 A1* | 5/2007 | Seib | G06Q 20/105 705/2 |
| 2008/0312948 A1* | 12/2008 | Kalliola | G06Q 10/06 705/14.49 |
| 2009/0140044 A1* | 6/2009 | Johanns | G06Q 20/347 235/380 |
| 2010/0088207 A1 | 4/2010 | McLaughlin et al. | |
| 2010/0094779 A1* | 4/2010 | Ohbitsu | G06Q 30/02 705/400 |
| 2011/0087592 A1* | 4/2011 | van der Veen | G06Q 20/12 705/44 |
| 2011/0145007 A1* | 6/2011 | Romanini | G06Q 50/22 705/2 |
| 2012/0130750 A1 | 5/2012 | Ketzef | |
| 2012/0143637 A1* | 6/2012 | Paradis | G06Q 20/347 705/4 |
| 2012/0150668 A1* | 6/2012 | Wade | G06Q 20/20 705/16 |
| 2012/0221466 A1* | 8/2012 | Look | G06Q 20/20 705/39 |
| 2016/0005020 A1* | 1/2016 | Fernando | G07G 1/14 705/21 |
| 2016/0012445 A1* | 1/2016 | Villa-Real | G06Q 20/347 705/4 |
| 2016/0034891 A1* | 2/2016 | Carpenter | G06Q 20/40 705/44 |
| 2016/0125386 A1* | 5/2016 | Desai | G06Q 20/322 705/41 |
| 2017/0011450 A1* | 1/2017 | Frager | G06Q 20/24 |
| 2017/0200162 A1* | 7/2017 | Pourfallah | G06Q 40/08 |
| 2018/0025334 A1* | 1/2018 | Pourfallah | G06Q 20/401 705/4 |
| 2018/0108055 A1* | 4/2018 | Chikuvadze | G06Q 50/26 |
| 2018/0108056 A1* | 4/2018 | Chikuvadze | G06Q 40/12 |
| 2018/0204216 A1* | 7/2018 | Jayaram | G06Q 20/027 |
| 2019/0385172 A1* | 12/2019 | Jayaram | G06Q 20/405 |
| 2020/0160337 A1* | 5/2020 | Fasoli | G06Q 40/08 |
| 2020/0184579 A1* | 6/2020 | Nitzschke | G07G 1/0036 |

OTHER PUBLICATIONS

International Preliminary Report on Patentability dated Jun. 3, 2021 in International Application PCT/US2019/061544.

* cited by examiner

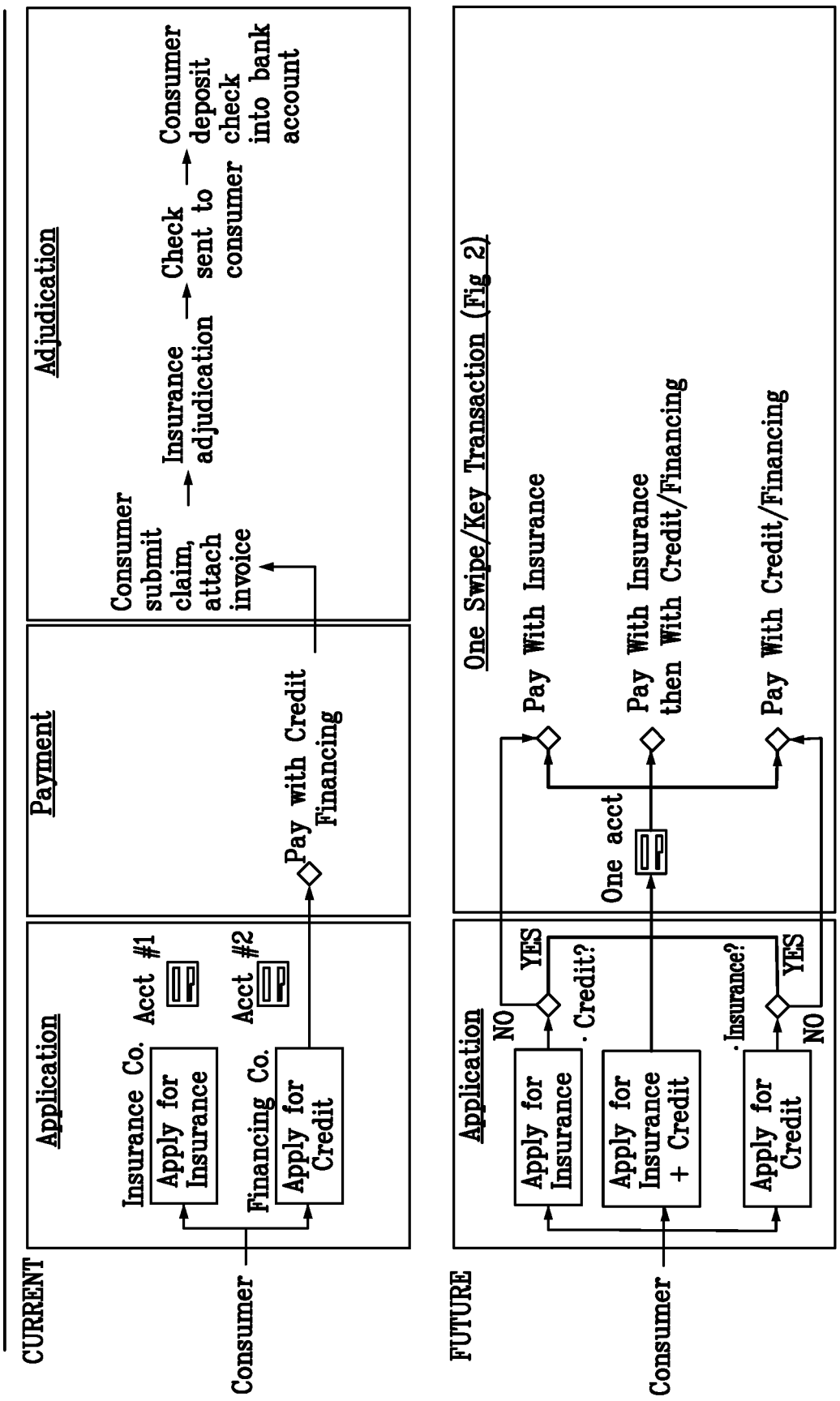
FIG. 1  Current State vs Future State

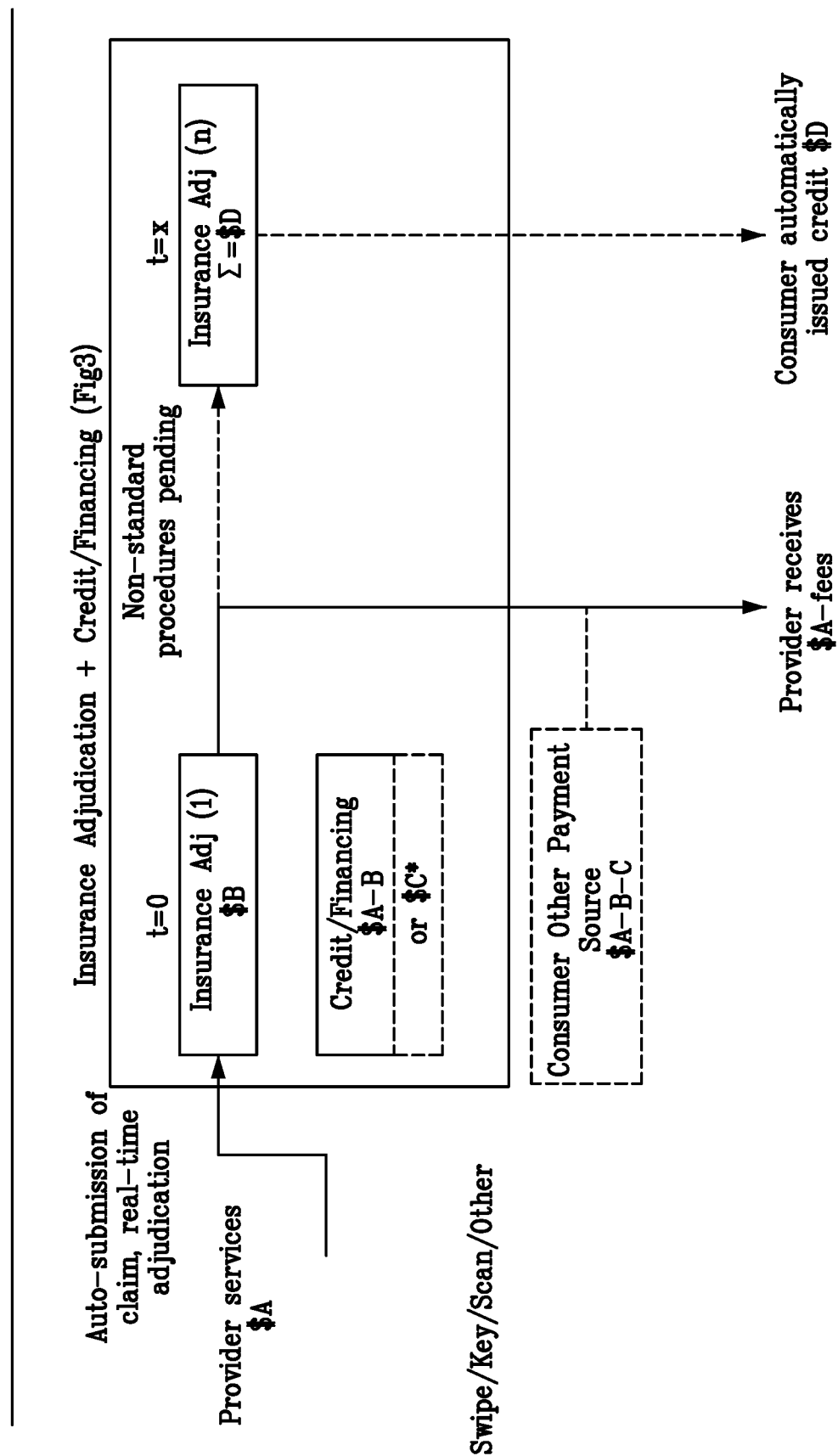
FIG. 2 One Swipe/Key – Insurance Adjudication + Credit/Financing

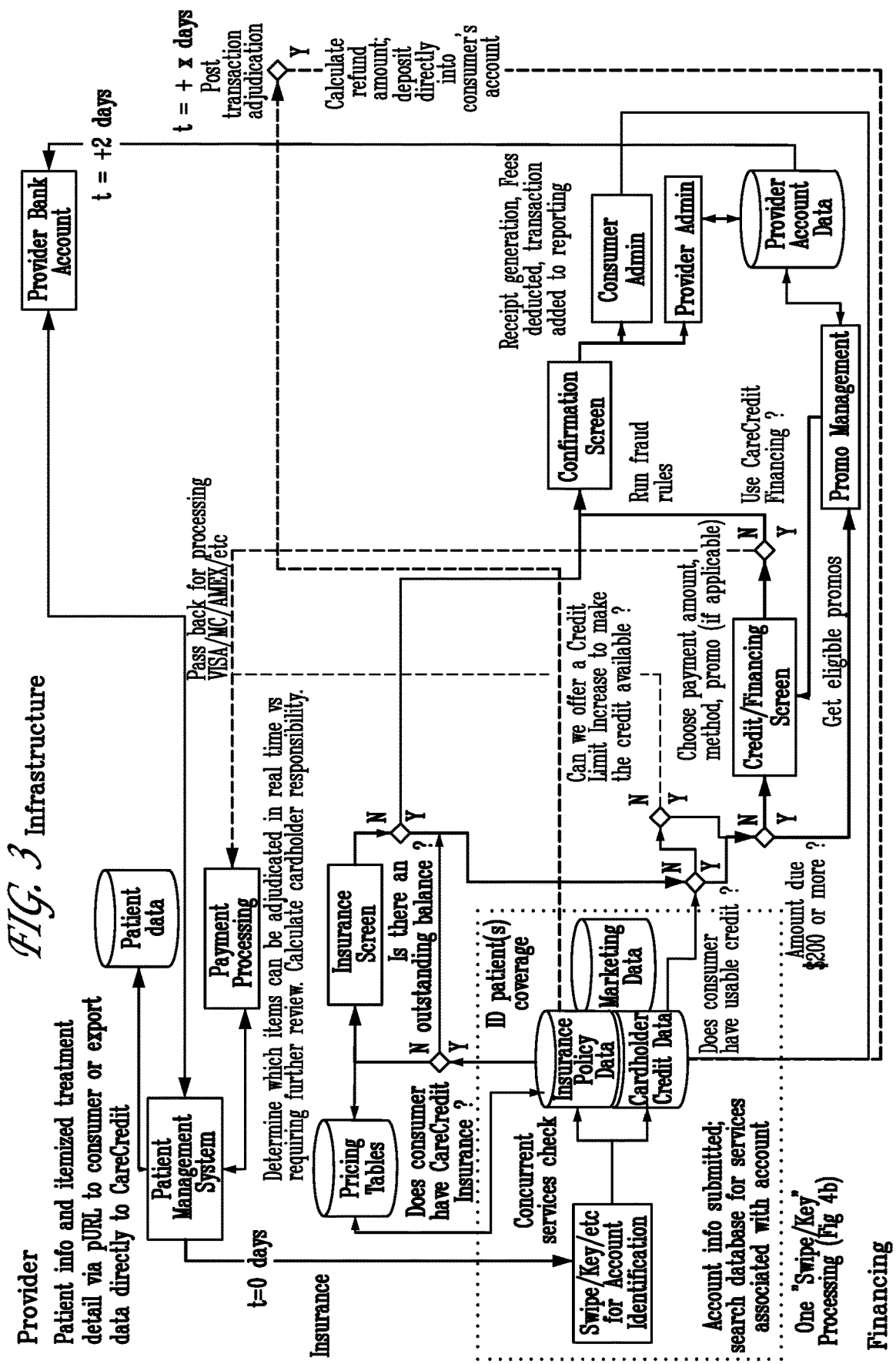
FIG. 3 Infrastructure

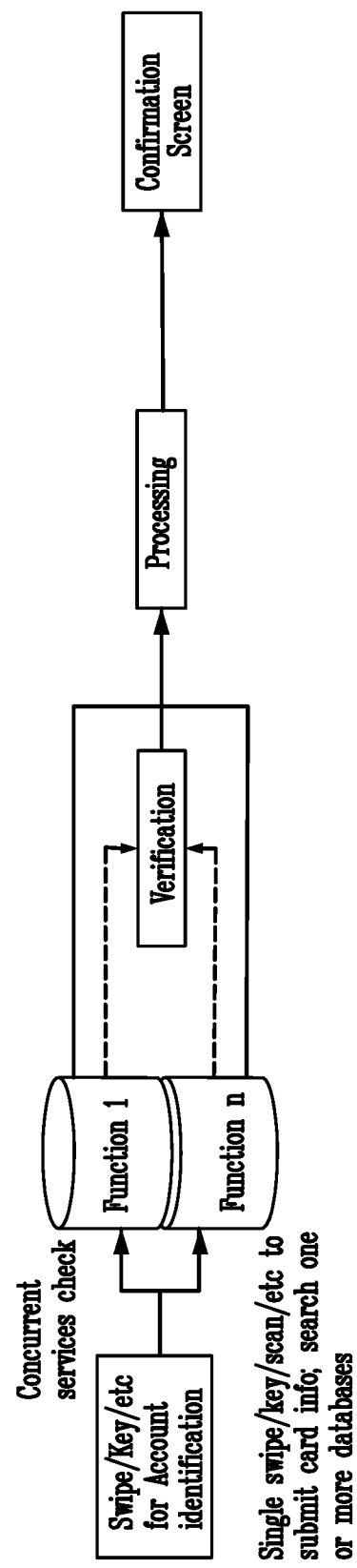

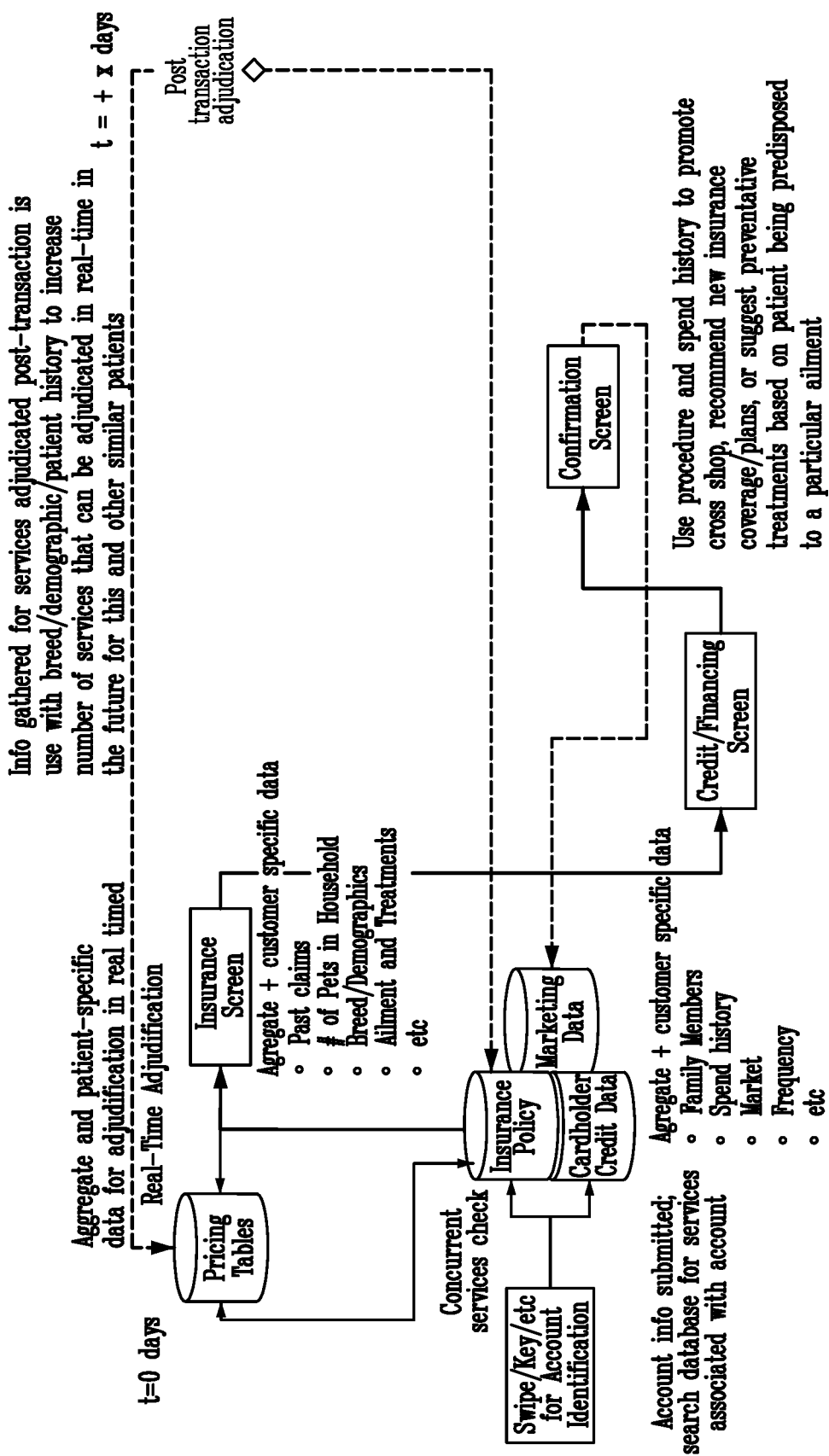
FIG. 4B  One "Swipe/Key" Processing

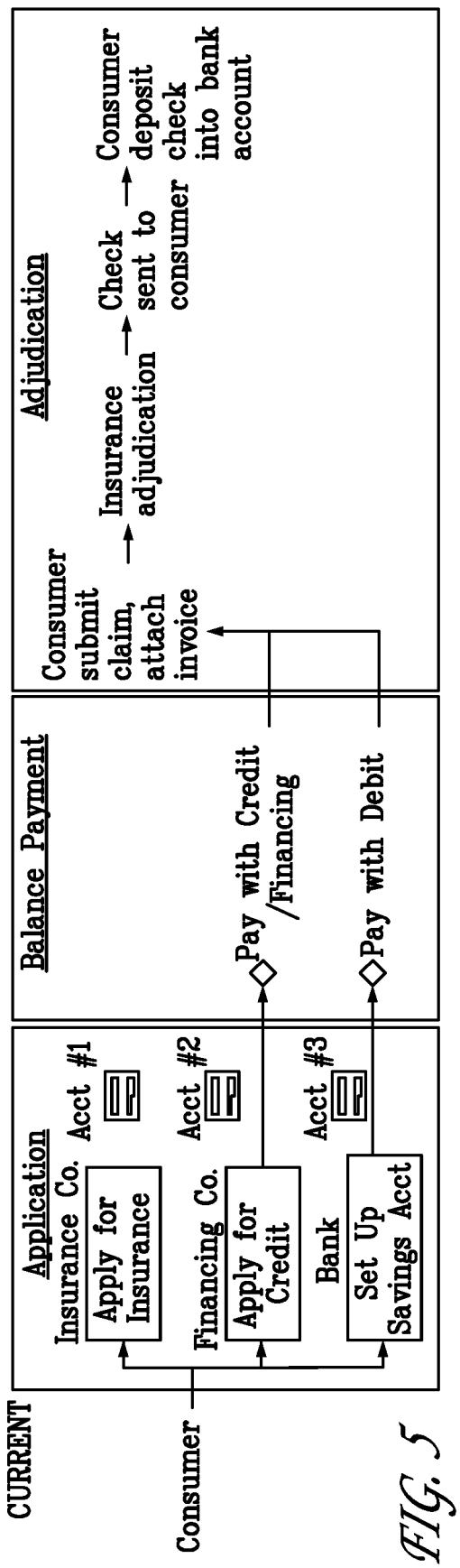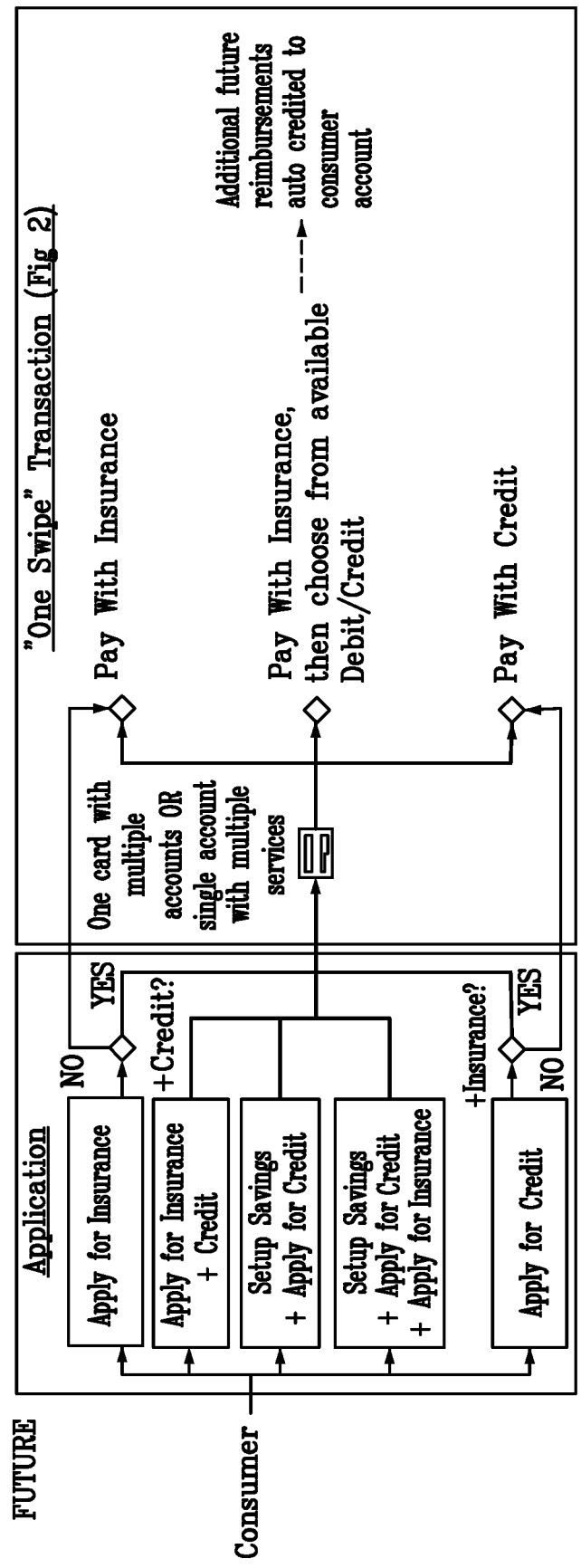
FIG. 5

CareCredit

Payment  🏠

① Account  >  ② Insurance  >  ③ Payment  >  ④ Review

Client Name: John Smith

Account Number: Enter Account Number [ __ - __ - __ ]

Look Up Account Number

Cardholder ID: Select One ▾

[ Next ]

*FIG. 10B*

CareCredit

Payment

① Account > ② Insurance > ③ Payment > ④ Review

Account Holder   John Smith (1234) has CareCredit Insurance
Patient Covered   Snowball
Plan Details   Plan A (Policy #234-13264)
              Carryover deductible: $xx
              xxOtherPlanDetails ....: $xx Items ready to be processed:                          Missing items? Add new

| Date | Service/Product | Cost | Plan Coverage | Client Responsibility | |
|------|-----------------|------|---------------|----------------------|---|
| 10/1/19 | Wellness Examination | $50 | $50 | $0 | ⊗ |
| 10/1/19 | Lab Work – Complete Blood Count | $150 | $150 | $0 | ⊗ |
| 10/1/19 | CAT scan | $900 | Pending | $900 | ⊗ |
| 10/1/19 | Diagnosis-X-ray, 1st Plate | $900 | Pending | $900 | ⊗ |
|  | Total | $2,000.00 | $200.00 | $1,800.00 | |

> Data pulled in via integration or manually add

[ Next ]   Skip

FIG. 10C

SINGLE ENTRY COMBINED FUNCTIONALITY

CROSS-REFERENCE TO RELATED APPLICATIONS

The present patent application claims the priority benefit of U.S. provisional patent application No. 62/770,434 filed Nov. 21, 2018 and U.S. provisional patent application No. 62/926,658 filed Oct. 28, 2019, the disclosures of which are incorporated by reference herein.

BACKGROUND OF THE INVENTION

1. Field of the Technology

The present invention is related to application functionality. More specifically, the present invention is related to single entry combined functionality.

2. Description of the Related Art

Presently, data entered into a system is often associated with a single functionality. For example, swiping a payment card can perform the singular function of applying an amount of funds (e.g., from a line of credit, other financial account, or insurance account) to a corresponding charge. In some situations, for example, a medical appointment, may require both an application of insurance (e.g., to pay for some or all of the medical appointment), and an application of credit (e.g., to pay for the deductible or for the appointment entirely). Indeed, sometimes an insurance account or health savings account can include available funds that can be applicable to the cost of a medical appointment, but some present systems require payment of the medical bill in full followed by a request for reimbursement, which can be cumbersome.

For example, when a consumer completes a medical appointment, they may use health insurance and one or many forms of payment including cash, check, debit, HSA/FSA or credit/financing. When applying insurance to healthcare-related costs, this process can involve first paying the healthcare bill in full on the day of service, then at a later date, submitting an insurance claim requesting reimbursement for the treatment. Full or partial post-transaction insurance reimbursement may be issued in the form of a physical check to the consumer, which is subsequently deposited by the consumer back into their bank account, which may then be used to replenish or pay off credit borrowed. This process is cumbersome and there are several opportunities to improve upon this process.

There is, therefore, a need in the art for improved systems and methods that are capable of cross-referencing data and concurrently performing more than one functionality based upon a single data entry (e.g., typed entry, scanned entry, swiped entry, etc.).

SUMMARY OF THE CLAIMED INVENTION

The first improvement is at the point-of-sale on day of service. Presently, a consumer card is associated with singular functionality—consumer has one card for utilizing insurance and separate card(s) for balance payment. Some embodiments seek to combine these cards by providing "one swipe" technology to (1) identify account(s), (2) simultaneously enable multiple functions (e.g. insurance and balance payment) and (3) allow user to select among payment sources available to the account holder. The "swipe" can be, but is not limited, to a swipe of a card via a terminal. It can also involve manual account entry, chip insert, card scan/tap, mobile payment technology, or any other means to identify the account number(s) being used.

In some embodiments, "one swipe" technology will eliminate system silos between insurance and payment functions, enabling data-sharing across platforms. This infrastructure change will allow for a seamless user experience from (1) account(s) identification to (2) insurance adjudication to (3) payment to (4) relevant automatic reimbursements—all in a single transaction.

In some embodiments, by elimination of such silos, the infrastructure presented above will facilitate real-time, cross-database machine learning and artificial intelligence to drive more efficient, accurate, real-time insurance adjudication, reduce the number of manual reviews required, offer cardholders access to find treatment options with higher insurance coverage, and provide customized financial advice to help the cardholder maximize savings and budget for their healthcare expenses.

BRIEF DESCRIPTION OF THE DRAWINGS

FIG. 1 illustrates a current state of the art system and an exemplary future state of the art system.

FIG. 2 represents an exemplary embodiment wherein "one swipe" can enable multiple processes to begin, including real time insurance adjudication and use of different payment options FIG. 3 depicts an exemplary infrastructure of "one swipe" triggering the start of multiple processes and the cross-referencing of data to streamline and complete insurance adjudication, debit/credit utilization, insurance reimbursement, and collection of marketing data in real-time.

FIG. 4A depicts an exemplary use of "one swipe" to concurrently commence one or more processes, while at the same time enabling the processes to work together cohesively as a singular service.

FIG. 4B is an exemplary illustration of sample datapoints collected at various stages that can be aggregated for machine learning or AI.

FIG. 5 illustrates a current state of the art system and the benefits of the future state of the art system with additional payment methods such as savings accounts.

FIGS. 10A-10F are exemplary screenshots of a system using "one swipe" technology according to some embodiments.

DETAILED DESCRIPTION

Figure 6:
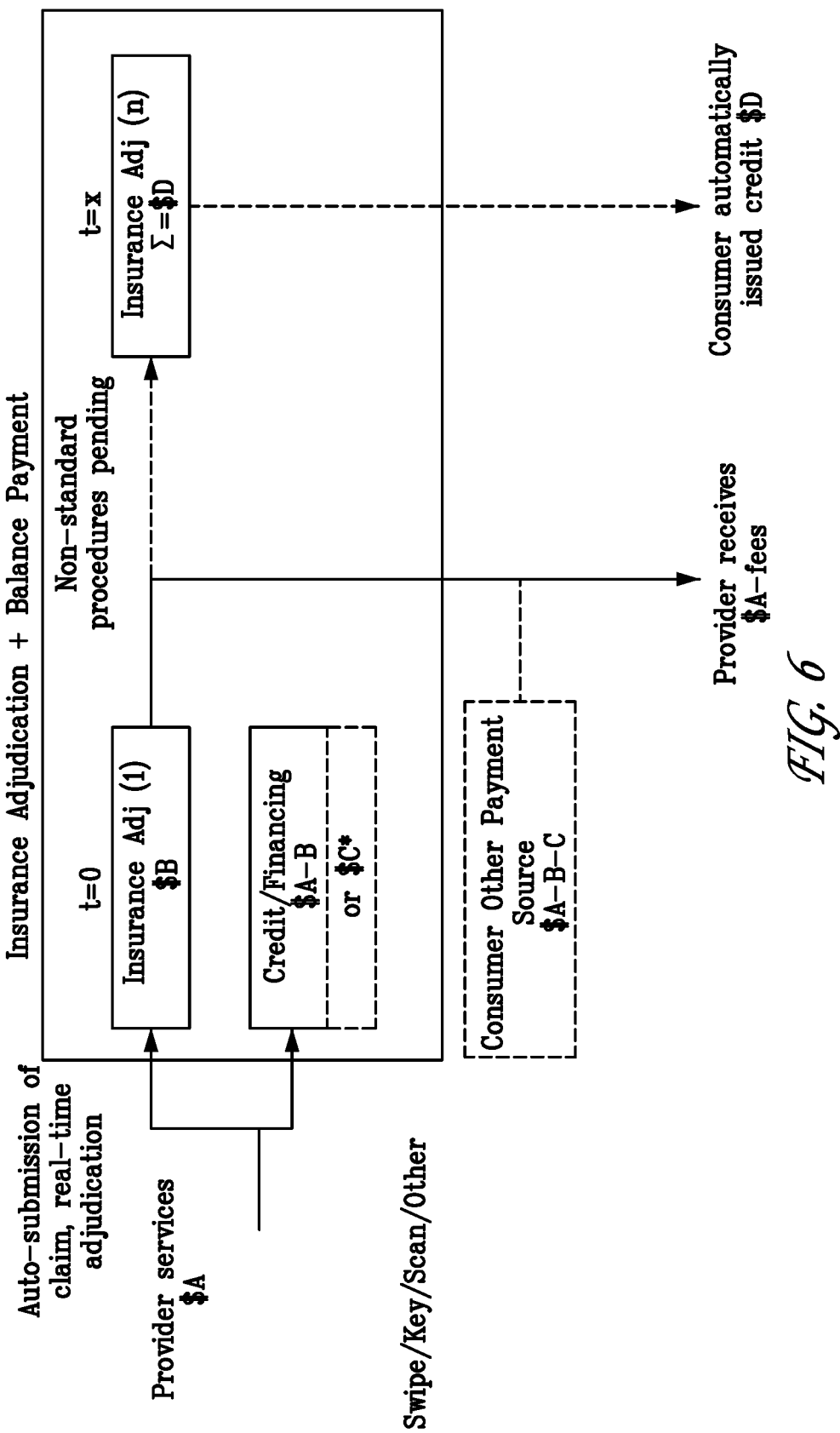
FIG. 6 represents an exemplary embodiment wherein "one swipe" can enable multiple processes to begin, including real time insurance adjudication and use of different payment options.

Embodiments of the present invention provide for an improved system wherein multiple functionalities can be performed based upon data received from "one swipe" (e.g., by swiping a card, by manually typing in the data, by scanning the data from a receipt or other document including barcode data, etc.). FIG. 1 illustrates a current state of the art system and an exemplary future state of the art system. As shown in the current state illustrated in FIG. 1, the consumer must apply for an insurance policy and apply for credit/financing separately. At time of payment, consumer must pay out of pocket in full, then seek reimbursement (e.g., from an insurance company). This two-step process can be inconvenient, cumbersome, and costly for the consumer.

In the future state illustrated in FIG. 1, a consumer has an additional option to apply for more than one service (e.g., both insurance and credit) at the same time. In the future state, the consumer can also avoid having to separately submit a bill for reimbursement post-transaction. In the future state, a single transaction can identify policy data and insurance coverage in real-time (reducing the consumer's out-of-pocket costs) and allow the consumer to submit payment for the remaining balance. Additionally, having access to both policy data (e.g., insurance policy data) and credit data (e.g., cardholder credit data) allows the system to apply funds (e.g., for insurance covered items, an insurance reimbursement), to an outstanding balance at the point-of sale or directly to the consumer's account shortly thereafter, automatically, and without cardholder intervention or interaction.

In some situations, multiple payment sources can be used to satisfy the payment for services. FIG. 2 represents an exemplary embodiment wherein "one swipe" (e.g., swipe, keyboard entry, scan, etc.), can cause at least two process to automatically begin. In this embodiment, the two processes are an insurance adjudication process and a credit (e.g., financing) process, which can act together to settle patient out-of-pocket costs in real-time. This saves the consumer from having to show proof of payment for the service to the insurance company and then waiting for the insurance company to adjudicate the claim and issue a reimbursement for out of pocket expenses (as applicable). If patient does not have sufficient means to cover the out-of-pocket costs using insurance or credit, they have the option to utilize other payment sources (e.g., provide another source of payment for the service, in the event the credit or financing, and the insurance, are not able to completely cover the amount for the service).

An exemplary infrastructure is shown in FIG. 3. In this example infrastructure, account information can be submitted to the system one time (e.g., by swipe, manual key entry, scan, etc.). In some embodiments, one or more processes can begin in real-time upon "one swipe". FIG. 3 depicts a system wherein a single entry of account information will cause two processes to begin at the same time or concurrently. In this case the two processes that begin concurrently are an insurance policy process and a cardholder credit process.

In some embodiments, each process will have a number of steps. Beginning with the insurance policy process in FIG. 3, several databases can be consulted in this process. For example, the insurance policy process in FIG. 3 includes a patient database, an insurance policy database, and pricing tables. Patient data can be identified by the system automatically and/or in real-time with "one swipe" (e.g., swipe, key entry, scan, etc.). An insurance policy database can be used to determine whether an individual has insurance coverage and the extent of the insurance coverage or determine if further review of the claim is necessary. Pricing tables can be used to determine patient (e.g., cardholder) responsibility (e.g., to adjudicate claims in real-time).

The cardholder credit database in FIG. 3 can be used (e.g., concurrently with data from a patient database), to determine whether a patient (e.g., a cardholder), has credit or whether an offer for an increase in line of credit (e.g., financing), can be made. Once cardholder responsibility and credit or other payment is determined, any eligible promotions can be presented and/or considered before payment is made.

In this example, a post-transaction adjudication process may be required, and can include calculating and distributing any available refund directly back the cardholder's account to replenish their line of credit. Moreover, the insurance post-transaction adjudication process and the cardholder reimbursement process can occur automatically and completely to resolution without additional human (e.g., cardholder) intervention.

An exemplary use of "one swipe" to concurrently commence one or more processes in real-time is illustrated in FIG. 4A using a computer. For example, a search of one or more databases can automatically and concurrently commence in real-time as information is entered into a system (e.g., by swipe, key stroke, scan, etc.), or after information has been entered into a system (e.g., by swipe, key stroke, scan, etc.). Some implementations can include a verification process prior to other processing and process confirmation. In these implementations, the commencement of multiple functionalities (e.g., checking two or more different non-distributed databases), can occur automatically and concurrently without additional human intervention. Data gathered at any point in these processes can be shared and used across platforms for machine learning to facilitate more and faster real-time adjudication at point of service, support marketing personalization and provide data to help consumers budget for future expenses.

FIG. 4B is an exemplary illustration of a more specific embodiment or application (e.g., in the medical field). As noted above, a single data entry (e.g., by swipe, key stroke, scan, etc.), can cause several processes to commence in real-time (as the data is entered), or immediately after the data has been entered. In the example illustrated in FIG. 4b, a real-time adjudication process is shown to demonstrate resolution of payment for medical service (e.g., human or non-human). An insurance policy database and a cardholder credit database are concurrently consulted in real-time as data is entered, or after data entry has been completed. Additionally, in this example, a post-transaction adjudication process is included. Data from all these process can be aggregated for predictive analysis with respect to population trends, insurance coverage (e.g., adjudication for this patient or similar future patients), and upsell of additional treatments by coverage level (e.g., preventative treatments for patients with a particular condition).

FIG. 5 illustrates a current state of the art system and an exemplary future state of the art system. In the current state illustrated in FIG. 5, the application for insurance is separate from the setup of debit or application of credit account(s) and there is no exchange of data between the systems. The consumer must apply or set up each service individually. When a medical balance is due, the consumer may choose to pay that balance directly via cash, check, debit, etc. or choose to finance the payment with credit. The balance paid by the consumer may sometimes be eligible for insurance reimbursement after payment. To be reimbursed, the consumer needs to submit a claim along with proof of payment to the insurance company for post-transaction adjudication. Any reimbursement granted from adjudication may be issued in the form of a check to the consumer, which then the consumer deposits into their account. The funds reimbursed to the consumer may be used to pay off any credit used. The process for reimbursement can be long and inconvenient for the consumer and thus provides an opportunity for innovation.

In the future state illustrated in FIG. 5, the consumer retains the ability to set up or apply for insurance and different payment methods in separate submissions, but also has the option to do so in a single, combined submission. The combined submission for these products takes advantage of similar business processes between the functions, providing an opportunity to reduce the number of steps for a submission compared to doing so separately. The outcome of this combined submission can result in a single card containing multiple accounts with a unique account for each product (ie. insurance, debit, credit), or a single card containing a single account with access to multiple products. If submission for these products are completed separately, the cardholder can request to combine these products onto a single card at a later date. With "one swipe" functionality, the cardholder can choose to only utilize a single service or apply multiple services in a single transaction. As these products are linked on the back end, any items not adjudicated in real time will result in a reimbursement at a future date can be automatically credited back to the cardholder's account based on pre-selected account preferences.

This "one swipe" functionality is further illustrated in FIG. 6 where the identification of the cardholder account details triggers a simultaneous check on cardholder policy and funding availability. Once the user's insurance policy is verified, the system can calculate patient responsibility (balance due). Some healthcare service expenses can be adjudicated in real-time which will be immediately removed from patient responsibility (or balance due), while others may require further manual review and be included in the balance due to be adjudicated at a later date. This balance due is presented alongside available payment methods of debit or credit identified through the "one swipe". If the cardholder chooses to use credit, but have insufficient credit available, they will be offered a credit limit increase where eligible. They can choose to pay the balance due partially or in full with the payment options available on the card, or utilize an alternate payment method. In instances where further manual review is required, as the infrastructure has access to both insurance policy data and cardholder debit/credit account(s), the system can automatically apply any future insurance reimbursements directly to the cardholder's account per their account preferences without needing further action from the cardholder.

Figure 7:
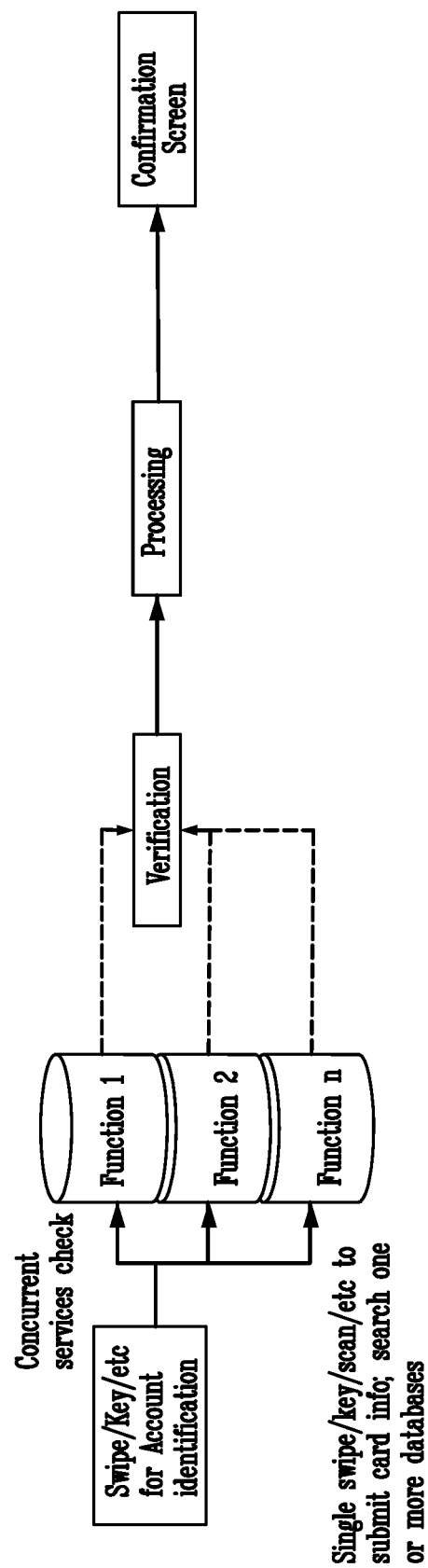
FIG. 7 depicts an exemplary use of "one swipe" to concurrently commence two or more processes, at the same time enabling the processes to work together cohesively as a singular service.

FIG. 7 shows a simplified diagram of "one swipe" initiating multiple processes simultaneously. In the current state, insurance and payment processes work independently and are fixed in chronological order. In the future state, the envelopment of different functions into a single infrastructure will collapse some processes into parallel paths and enable the functions to work more cohesively as a singular service. The benefits of a singular service include: (1) user can access outputs from multiple databases including insurance policy, pricing tables, account balances, cardholder data, etc., (2) user can move back and forth between interfaces for different functions seamlessly in real-time, (3) updates in any point in the infrastructure can be reflected across the entire infrastructure in real-time, and (4) intelligence or data calculations from one service can feed or alter that of another (and vice versa).

Figure 8A:
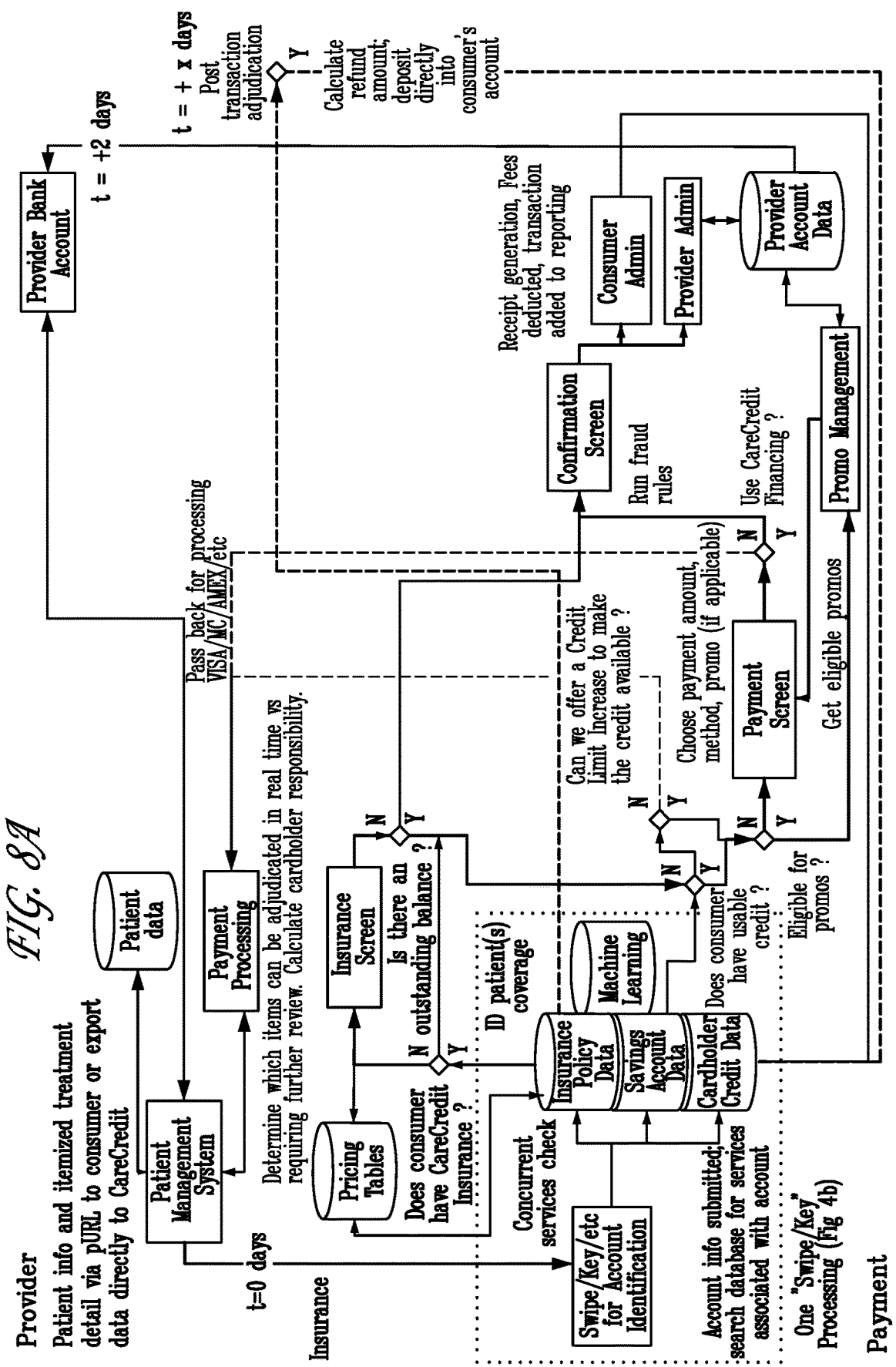
FIG. 8A depicts an exemplary infrastructure of "one swipe" triggering the start of multiple processes and the cross-referencing of data to streamline and complete insurance adjudication, debit/credit utilization, insurance reimbursement and machine learning in real-time.

FIG. 8A shows the different processes relating to the use of insurance, debit and credit to pay for medical treatment. Upon the card swipe, the system will simultaneously check and verify patient data, validate level of insurance coverage and calculate patient responsibility. In this action, it can also check cardholder's eligibility to pay from a debit account versus available credit limit. If financing is determined to be the method of payment, the system will check available credit against patient responsibility and automatically offer a credit limit increase if cardholder has insufficient credit and is eligible for an increase. If purchase is eligible for promotional financing, the system will offer the terms to the cardholder and process the transaction. Post-transaction, if additional items are adjudicated in the cardholder's favor, the system can calculate the reimbursement and automatically reimburse funds back to cardholder's account without further human intervention.

In addition to the automation of such processes illustrated above, FIG. 8B illustrates how the interconnections of these systems allow for machine learning in real time across all functions. The collection of data relating to insurance—including but not limited to household members, pets and breeds, common ailments by pet breed, treatments prescribed, outcome of manual claim reviews/adjudication, etc.—can be used either singularly or in aggregate across all cardholders to further inform future claim submissions, to increase real-time adjudication, reduce manual reviews, and minimize the patient's financial responsibility upfront.

Figure 8B:
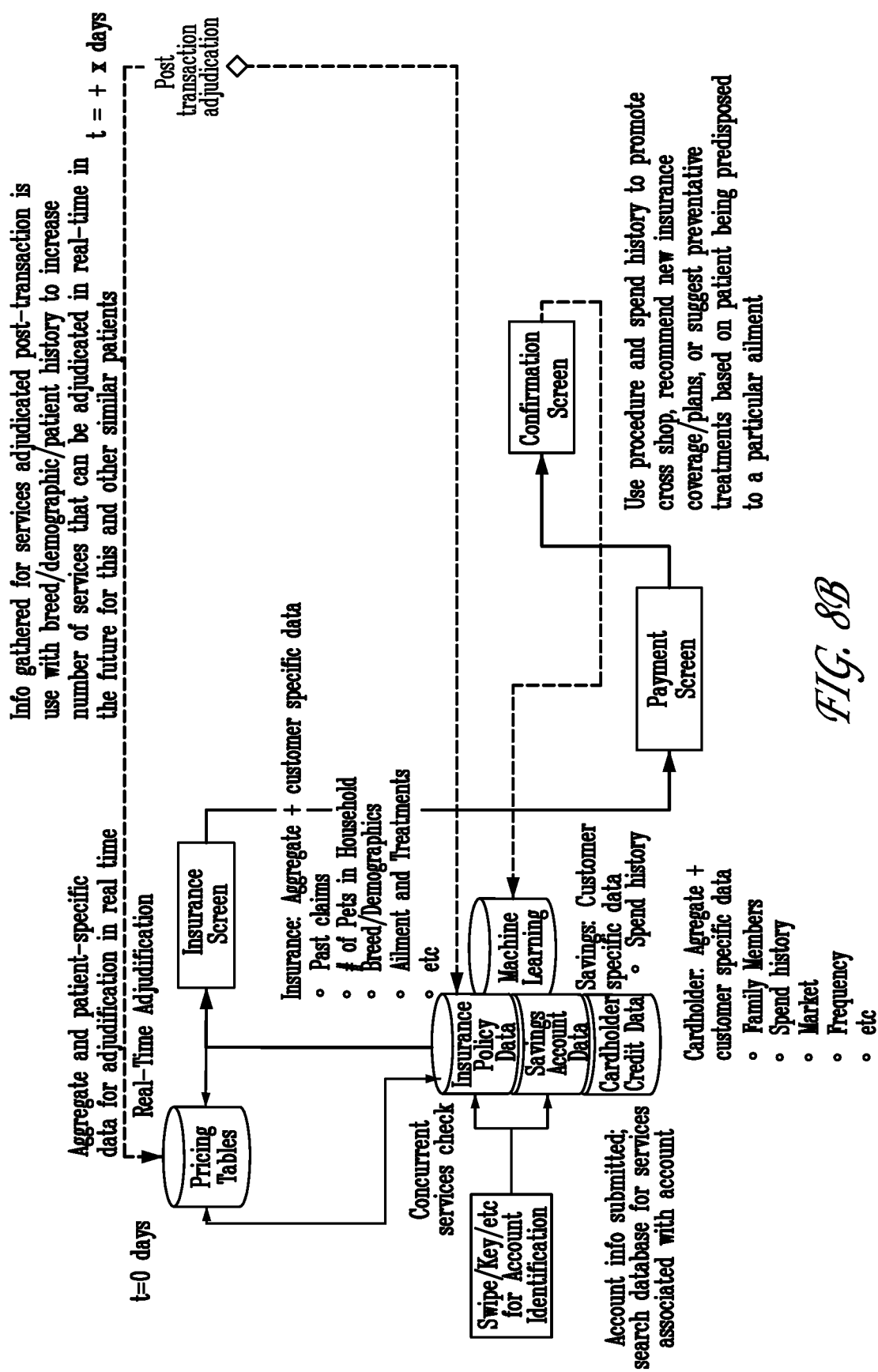
FIG. 8B is an exemplary illustration of sample datapoints collected at various stages that can be aggregated for machine learning or AI.

Further, FIG. 8B illustrates this historical transactional information can also be used for machine learning to provide more relevant and personalized information for the cardholder who just transacted, as well as applied to other similar future patients within the database. One such application would be enabling the system to make recommendations to the consumer on the best insurance plan a patient should buy, which treatment alternatives offer the higher insurance coverage, or which financing options to utilize based on the probability of a health event occurring and typical costs associated with that health event. Other applications include customized marketing messaging or content. This information may be ascertained using artificial intelligence or machine learning techniques.

Figure 9:
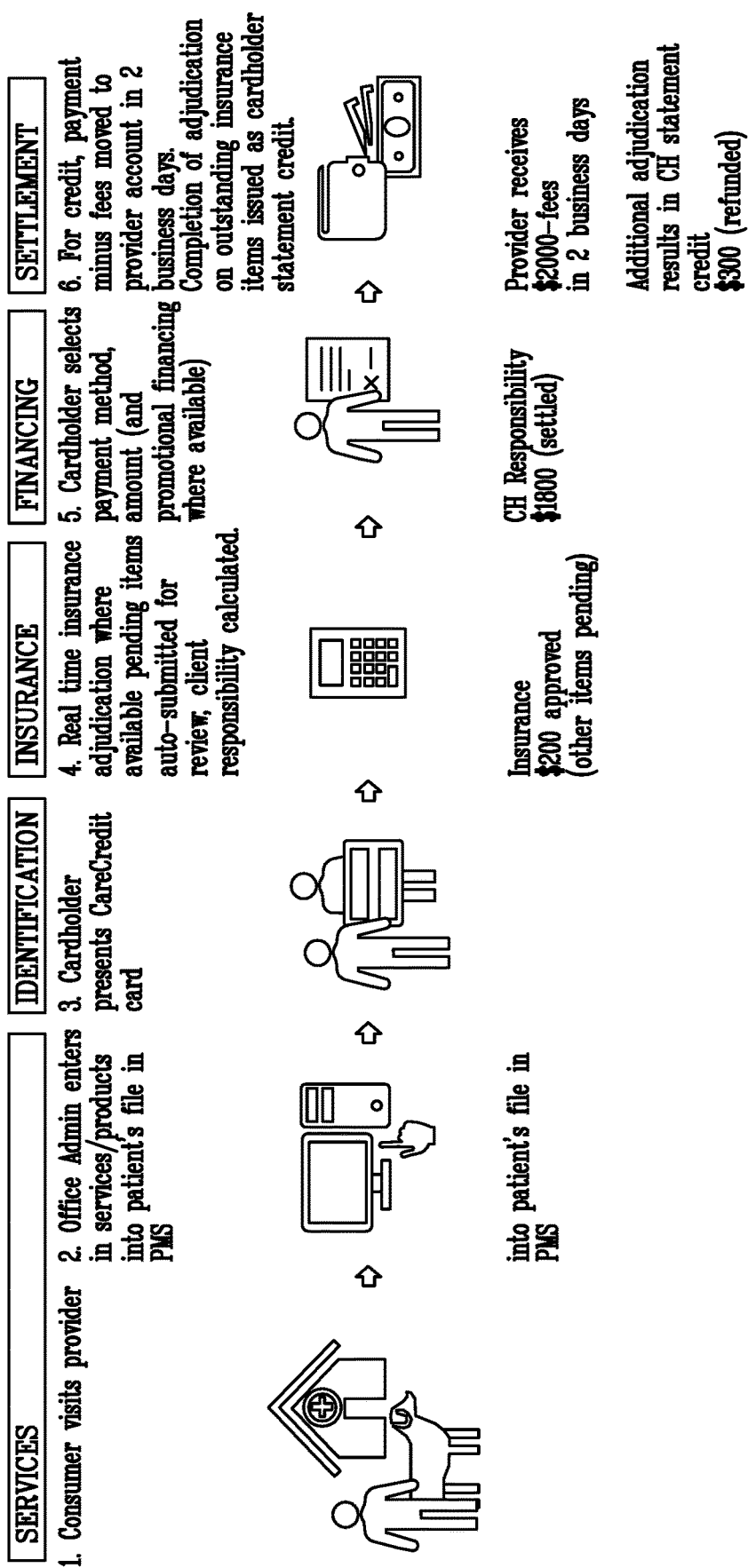
FIG. 9 is an exemplary flowchart of an in-office transaction using "one swipe" technology according to some embodiments.

FIG. 9 is an exemplary flowchart of an in-office transaction using "one swipe" technology according to some embodiments. At step 1, a consumer visits a provider, such as a doctor, medical facility, veterinarian, goods or services provider, and/or the like. At step 2, the office administrator enters services or products desired into the patient's file and generates a bill. For exemplary purposes in FIG. 9, the bill is $2,000. At step 3, the cardholder presents his CareCredit card. At step 4, real time insurance adjudication is made where available, and pending items are auto-submitted for review. The remaining client responsibility is calculated. In this case, insurance approved $200 and other items are pending.

At step 5, the cardholder selects a payment method, amount, and potentially promotional financing. In this case, the cardholder responsibility is $1800 that is settled. At step 6, for credit, payment minus fees are moved to the provider account in 2 business days. In this case, the provider may receive the $2000 minus fees in 2 business days. Completion of manual insurance adjudication may result in an additional $300 of insurance coverage, which will be refunded automatically to the cardholder's account without human intervention.

FIG. 9 reflects one embodiment of the systems and methods described herein. In other embodiments, the systems and methods described herein address these needs and others by the combination of: (1) utilizing real time insurance adjudication to reduce out-of-pocket costs at time of service (2) utilizing CareCredit credit functionality to pay out-of-pocket costs (i.e., a deductible) owed to his healthcare provider upfront, (3) utilizing CareCredit financing options to distribute repayment responsibility (to CareCredit) across a defined period of months, (4) utilizing cross-platform connections to automatically reimburse the consumer for funds owed.

Figure 10A:
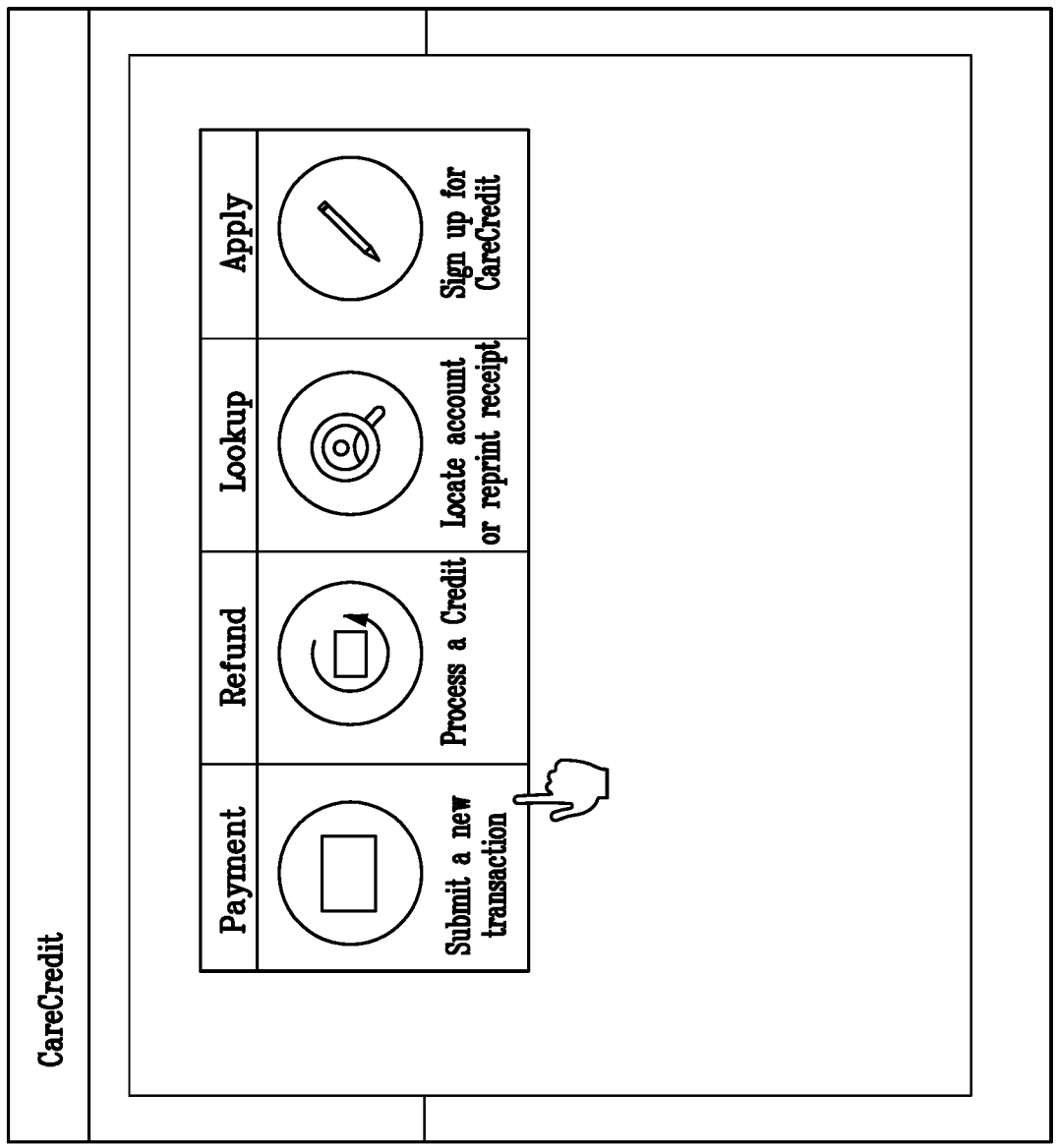

Referring back to FIGS. 10A-10F, FIGS. 10A-10F are exemplary screenshots of a system using "one swipe" technology according to some embodiments. FIG. 10A is a provider interface that may be used by an office administrator to initiate a "one swipe" transaction. A provider may select to submit a new transaction, process a credit, locate an account or reprint a receipt, or sign up for CareCredit. FIG. 10B is an exemplary screen shot of a provider interface that may be used to enter client details, such as name, account number, and cardholder ID.

FIG. 10C is an exemplary interface for entering insurance information and determining coverage for services or goods provided. This data may be pulled in manually or integrated to be provided automatically. Artificial intelligence and/or machine learning may be used to match service descriptions with covered services to determine insurance coverage. In addition, coverage may be analyzed to recommend further coverage, do cross-marketing for other services, etc. Data about particular goods and services provided as well as coverage may be aggregated to draw conclusions about patients and make suggestions. For example, if services provided indicate hip dysplasia and a large number of golden retrievers are seen with those symptoms, preventative treatments may be suggested to upsell the consumer.

Figure 10D:
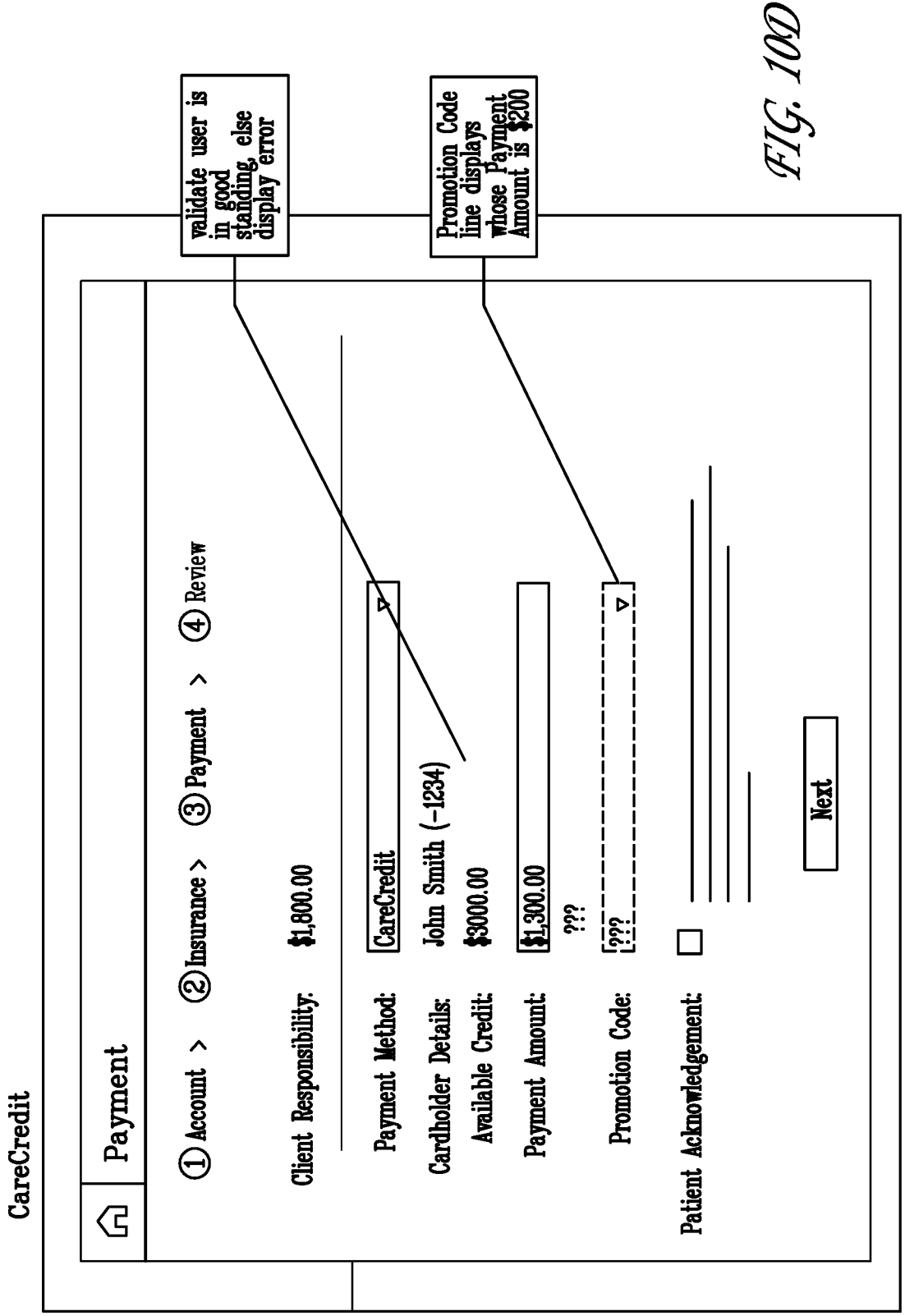
Figure 10E:
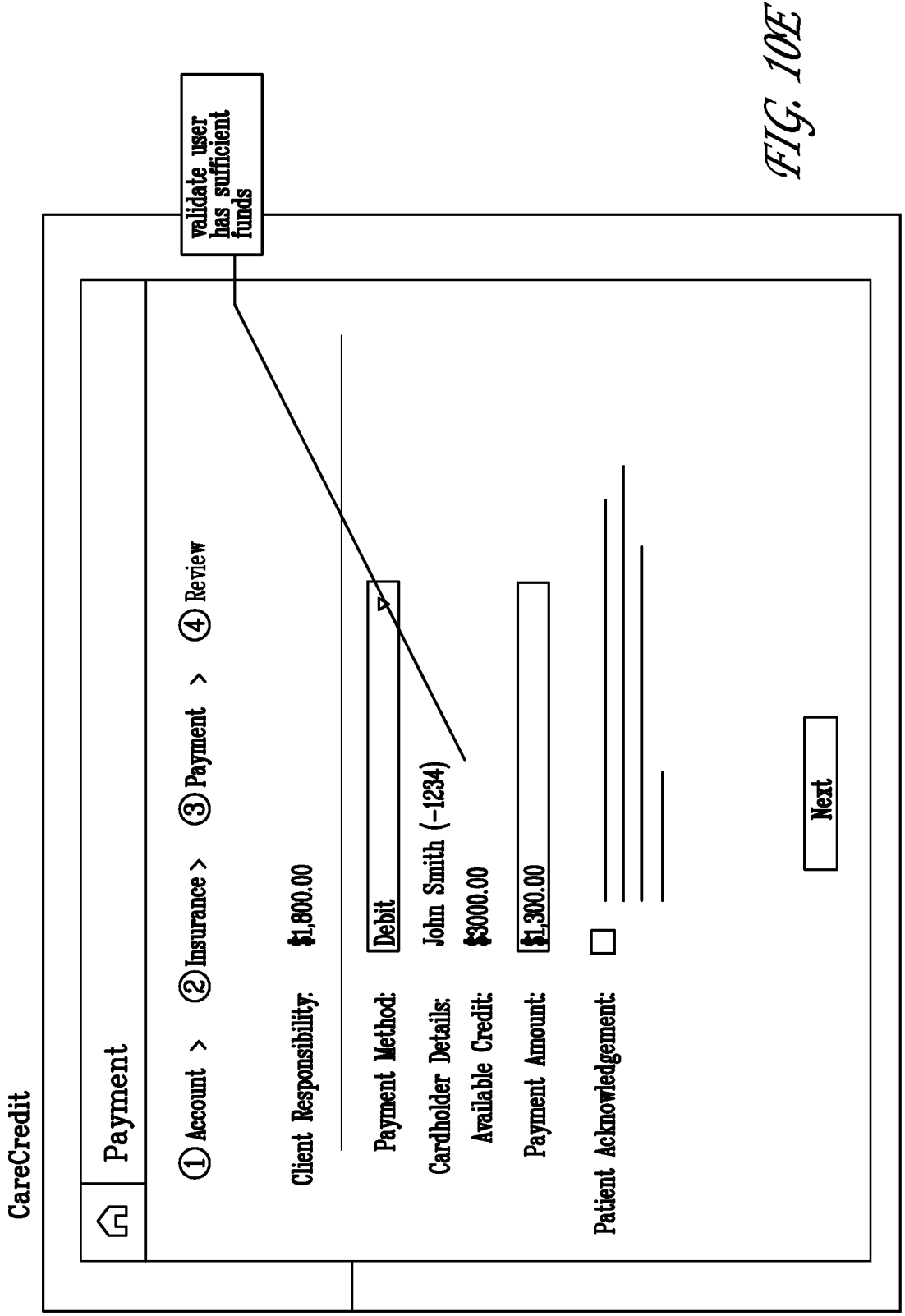
Figure 10F:
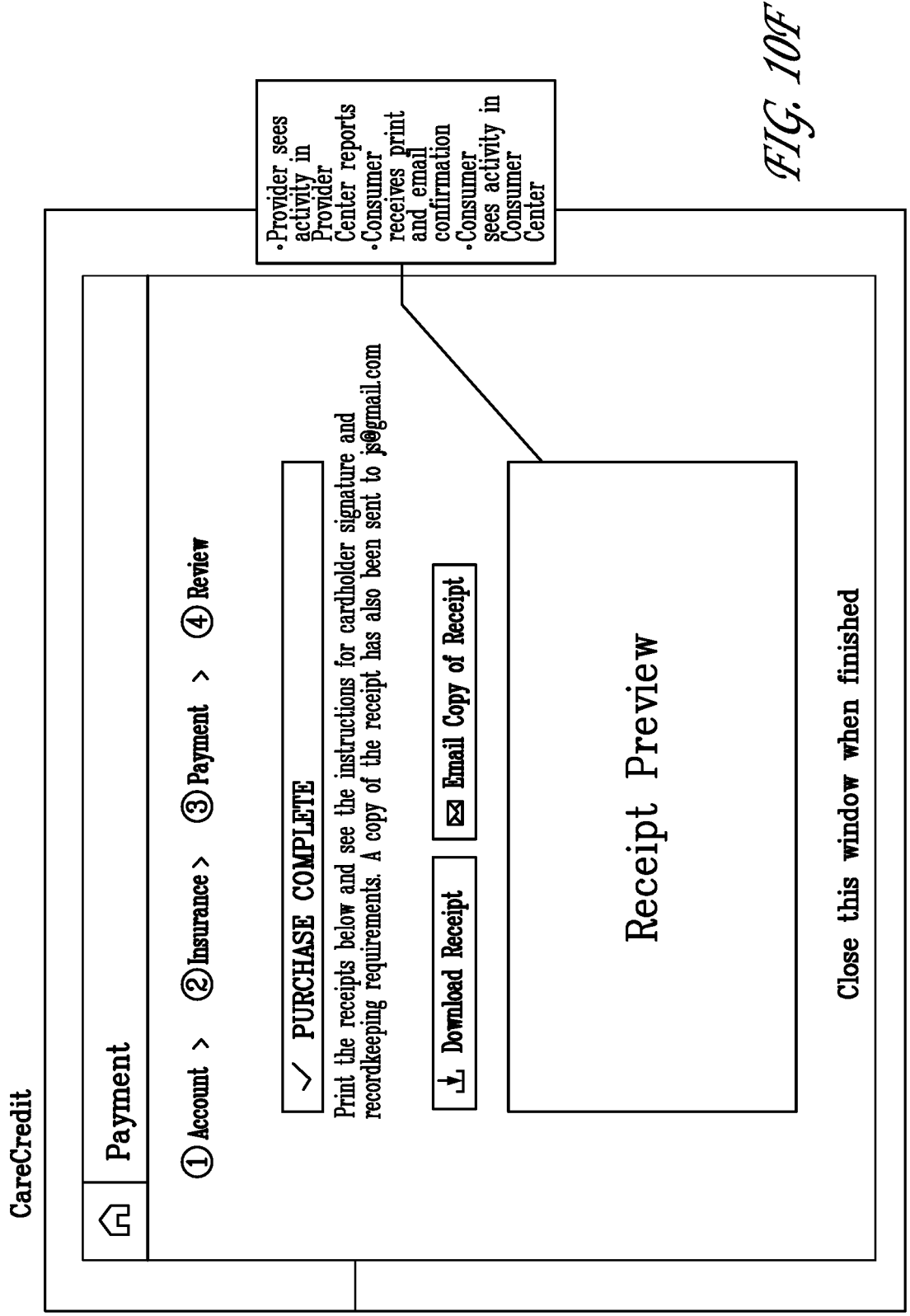

FIG. 10D is an exemplary interface for collecting a payment for the consumer responsible amount of the transaction. The provider may enter a payment amount from available credit and select promotional financing on behalf of the consumer. FIG. 10E is an interface to allow the consumer to utilize an alternative payment method. FIG. 10F is an exemplary interface for providing a receipt for the transaction.

The disclosed single entry dual functionality system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transfoat storage medrmation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples. A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples. Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   receiving card data from a single input action corresponding to a transaction at a terminal device, wherein the card data from the single input action corresponds to a plurality of accounts associated with a plurality of different service provider platforms, and wherein the plurality of different service provider platforms are associated with a plurality of different non-distributed system databases;
   concurrently transmitting the card data in real-time, wherein when the card data is received at a first service provider platform associated with a first non-distributed system database storing first account data, the first service provider platform makes a first determination as to the first account data, and wherein when the card data is received at a second service provider platform associated with a second non-distributed system database storing second account data, the second service provider platform makes a second determination as to the second account data;
   using a trained machine learning algorithm on the card data and historical transaction data to automatically adjudicate the transaction in real-time for both the first account data and the second account data, wherein the transaction is adjudicated without user intervention, and wherein automatically adjudicating the transaction includes parallel processing of two or more different transaction processing functions according to the first and the second non-distributed system databases;
   updating the historical transaction data with the adjudicated first account data and adjudicated second account data; and
   updating the machine-learning algorithm with the updated historical transaction data, wherein the updated machine-learning algorithm is used to adjudicate a future transaction.

2. The computer-implemented method of claim 1, wherein the first service provider platform corresponds to an insurance system, the first non-distributed system database includes an insurance policy database of the insurance system, the determination as to the first account data includes an extent of insurance coverage according to the insurance policy database, and wherein executing one of the two or more different transaction processing functions includes using the extent of insurance coverage for a portion of the transaction.

3. The computer-implemented method of claim 1, wherein the second service provider platform corresponds to a payment source system, the second non-distributed system database includes a cardholder database of the payment source system, the determination as to the second account data includes an amount of payment funds according to the cardholder database, and wherein executing one of the two or more different transaction functions includes using the amount of payment funds for a portion of the transaction.

4. The computer-implemented method of claim 1, further comprising:
storing the updated historical transaction data in a machine learning database, wherein using the updated machine learning algorithm includes customizing one or more future transaction processing functions of the future transaction.

5. The computer-implemented method of claim 1, further comprising determining that data regarding the user includes a user preference, wherein executing the two or more different transaction processing functions is further based on the user preference.

6. The computer-implemented method of claim 1, wherein a result of one of the two or more different transaction processing functions corresponds to a portion of the transaction, and wherein another one of the two or more different transaction processing functions corresponds to another portion of the transaction.

7. The computer-implemented method of claim 6, wherein the second account data initially indicates an insufficient level of available funds for use in processing the transaction, and wherein one of the two or more different transaction processing functions includes automatically processing an increase to the level of available funds, wherein the increased level of available funds is used to adjudicate the transaction.

8. A system, comprising:
a communication interface configured to communicate over a communication network with a plurality of different service provider platforms, wherein the communication interface further:
receives card data from a single input action corresponding to a transaction at a terminal device, the card data from the single input action corresponding to a plurality of accounts associated with the plurality of different service provider platforms, and wherein the plurality of service provider platforms are associated with a plurality of different non-distributed system databases; and
concurrently transmits the card data in real-time, wherein when the card data is received at a first service provider platform associated with a first non-distributed system database storing first account data, the first service provider platform makes a first determination as to the first account data, and wherein when the card data is received at a second service provider platform associated with a second non-distributed system database storing second account data, the second service provider platform makes a second determination as to the second account data;
and one or more processors that execute instructions stored in a non-transitory computer-readable storage medium, wherein the processors execute the instructions to:
using a trained machine learning algorithm on the card data and historical transaction data to automatically adjudicate the transaction in real-time for both the first account data and the second account data, wherein the transaction is adjudicated without user intervention, and wherein automatically adjudicating the transaction includes parallel processing of two or more different transaction processing functions according to the first and the second non-distributed system databases;
updating the historical transaction data with the adjudicated first account data and adjudicated second account data; and
updating the machine-learning algorithm with the updated historical transaction data, wherein the updated machine-learning algorithm is used to adjudicate a future transaction.

9. The system of claim 8, wherein the first service provider platform corresponds to an insurance system, the first non-distributed system database includes an insurance policy database of the insurance system, the determination as to the first account data includes an extent of insurance coverage according to the insurance policy database, and wherein executing one of the two or more different transaction processing functions includes using the extent of insurance coverage for a portion of the transaction.

10. The system of claim 8, wherein the second service provider platform corresponds to a payment source system, the second non-distributed system database includes a cardholder database of the payment source system, the determination as to the second account data includes an amount of payment funds according to the cardholder database, and wherein executing one of the two or more different transaction functions includes using the amount of payment funds for a portion of the transaction.

11. The system of claim 8, further comprising:
a machine learning database that stores the updated historical transaction data, wherein using the updated machine learning algorithm includes customizing one or more future transaction processing functions of the future transaction.

12. The system of claim 8, wherein the non-transitory computer-readable storage medium further includes: instructions that when executed, determine that data regarding the user includes a user preference, wherein executing the two or more different transaction processing functions is further based on the user preference.

13. The system of claim 8, wherein a result of one of the two or more different transaction processing functions corresponds to a portion of the transaction, and wherein another one of the two or more different transaction processing functions corresponds to another portion of the transaction.

14. The system of claim 13, wherein the second account data initially indicates an insufficient level of available funds for use in processing the transaction, and wherein one of the two or more different transaction processing functions includes automatically processing an increase to the level of available funds, wherein the increased level of available funds is used to adjudicate the transaction.

15. A non-transitory, computer-readable storage medium, having embodied thereon a program executable by a processor to perform a method comprising:
receiving card data from a single input action corresponding to a transaction at a terminal device, wherein the card data from the single input action corresponds to a plurality of accounts associated with a plurality of different service provider platforms, and wherein the plurality of different service provider platforms are associated with a plurality of different non-distributed system databases;

concurrently transmitting the card data in real-time, wherein when the card data is received at a first service provider platform associated with a first non-distributed system database storing first account data, the first service provider platform makes a first determination as to the first account data, and wherein when the card data is received at a second service provider platform associated with a second non-distributed system database storing second account data, the second service provider platform makes a second determination as to the second account data;

using a trained machine learning algorithm on the card data and historical transaction data to automatically adjudicate the transaction in real-time for both the first account data and the second account data, wherein the transaction is adjudicated without user intervention, and wherein automatically adjudicating the transaction includes parallel processing of two or more different transaction processing functions according to the first and the second non-distributed system databases;

updating the historical transaction data with the adjudicated first account data and adjudicated second account data; and updating the machine-learning algorithm with the updated historical transaction data, wherein the updated machine-learning algorithm is used to adjudicate a future transaction.

16. The computer-readable storage medium of claim 15, wherein the first service provider platform corresponds to an insurance system, the first non-distributed system database includes an insurance policy database of the insurance system, the determination as to the first account data includes an extent of insurance coverage according to the insurance policy database, and wherein executing one of the two or more different transaction processing functions includes using the extent of insurance coverage for a portion of the transaction.

17. The computer-readable storage medium of claim 15, wherein the second service provider platform corresponds to a payment source system, the second non-distributed system database includes a cardholder database of the payment source system, the determination as to the second account data includes an amount of payment funds according to the cardholder database, and wherein executing one of the two or more different transaction functions includes using the amount of payment funds for a portion of the transaction.

18. The computer-readable storage medium of claim 15, further comprising instructions that when executed:

store the updated historical transaction data in a machine learning database, wherein using the updated machine learning algorithm includes customizing one or more future transaction processing functions of the future transaction.

19. The computer-readable storage medium claim 15, further comprising determining that data regarding the user includes a user preference, wherein executing the two or more different transaction processing functions is further based on the user preference.

20. The computer-readable storage medium of claim 15, wherein a result of one of the two or more different transaction processing functions corresponds to a portion of the transaction, and wherein another one of the two or more different transaction processing functions corresponds to another portion of the transaction.

21. The computer-readable storage medium of claim 20, wherein the second account data initially indicates an insufficient level of available funds for use in processing the transaction, and wherein one of the two or more different transaction processing functions includes automatically processing an increase to the level of available funds, wherein the increased level of available funds is used to adjudicate the transaction.

22. The computer-implemented method of claim 1, wherein the two or more different transaction processing functions are part of different parallel paths associated with the different service provider platforms, and wherein the two or more different transaction processing functions are executed in parallel according to the parallel paths.

23. The computer-implemented method of claim 1, further comprising sharing information across the different service provider platforms associated with the different non-distributed system databases.

24. The computer-implemented method of claim 22, further comprising using the shared information for machine learning, wherein the use of the shared information for machine learning modifies execution of at least one of the two or more different transaction processing functions.

25. The system of claim 8, wherein the two or more different transaction processing functions are part of different parallel paths associated with the different service provider platforms, and wherein the two or more different transaction processing functions are executed in parallel according to the parallel paths.

26. The system of claim 8, wherein the processors further share information across the different service provider platforms associated with the different non-distributed system databases.

27. The system of claim 26, wherein the processors further use the shared information for machine learning, wherein the use of the shared information for machine learning modifies execution of at least one of the two or more different transaction processing functions.

28. The computer-readable storage medium of claim 15, wherein the two or more different transaction processing functions are part of different parallel paths associated with the different service provider platforms, and wherein the two or more different transaction processing functions are executed in parallel according to the parallel paths.

29. The computer-readable storage medium of claim 15, further comprising: instructions that when executed, share information across the different service provider platforms associated with the different non-distributed system databases.

30. The computer-readable storage medium of claim 29, further comprising: instructions that when executed, use the shared information for machine learning, wherein the use of the shared information for machine learning uses the shared information to modify execution of at least one of the two or more different transaction processing functions.

31. The computer-implemented method of claim 1, further comprising providing an integrated interface at the terminal device that presents data associated with settling the transaction across the plurality of different service provider platforms, wherein data output from the plurality of system databases are accessible via the integrated interface.

32. The computer-implemented method of claim 31, wherein the integrated interface seamlessly switches from a first one of the two or more transaction processing functions to a second one of the two or more transaction processing functions.

33. The computer-implemented method of claim 32, further comprising providing a receipt for the transaction via the integrated interface, wherein the receipt includes the first transaction processing function executed upon the first account data and the second transaction processing function executed upon the second account data.

34. The system of claim 8, further comprising providing an integrated interface at the terminal device that presents data associated with settling the transaction across the plurality of different service provider platforms, wherein data output from the plurality of system databases are accessible via the integrated interface.

35. The system of claim 34, wherein the integrated interface seamlessly switches from a first one of the two or more transaction processing functions to a second one of the two or more transaction processing functions.

36. The system of claim 35, further comprising providing a receipt for the transaction via the integrated interface, wherein the receipt includes the first transaction processing function executed upon the first account data and the second transaction processing function executed upon the second account data.

37. The computer-readable storage medium of claim 15, further comprising providing an integrated interface at the terminal device that presents data associated with settling the transaction across the plurality of different service provider platforms, wherein data output from the plurality of system databases are accessible via the integrated interface.

38. The computer-readable storage medium of claim 37, wherein the integrated interface seamlessly switches from a first one of the two or more transaction processing functions to a second one of the two or more transaction processing functions.

39. The computer-readable storage medium of claim 38, further comprising providing a receipt for the transaction via the integrated interface, wherein the receipt includes the first transaction processing function executed upon the first account data and the second transaction processing function executed upon the second account data.

* * * * *